(12) United States Patent
Marcinkiewicz et al.

(10) Patent No.: US 7,208,895 B2
(45) Date of Patent: Apr. 24, 2007

(54) CONTROL SYSTEMS AND METHODS FOR PERMANENT MAGNET ROTATING MACHINES (75) Inventors: Joseph G. Marcinkiewicz, St. Peters, MO (US); Prakash B. Shahi, St. Louis, MO (US); Michael I. Henderson, North Yorkshire (GB)

(73) Assignee: Emerson Electric Co., St. Louis, MO (US)

( * ) Notice: Subject to any disclaimer, the term of this patent is extended or adjusted under 35 U.S.C. 154(b) by 0 days.

(21) Appl. No.: 11/293,743

(22) Filed: Dec. 2, 2005

(65) Prior Publication Data

US 2006/0290304 A1 Dec. 28, 2006

Related U.S. Application Data (60) Provisional application No. 60/694,077, filed on Jun. 24, 2005, provisional application No. 60/694,066, filed on Jun. 24, 2005.

(51) Int. Cl.
*H02K 21/00* (2006.01)

(52) U.S. Cl. ............... 318/254; 318/138; 318/439; 318/701

(58) Field of Classification Search ............... 318/754, 318/138, 439, 701, 717, 723, 798, 815, 432, 318/433; 388/907.5, 902, 815
See application file for complete search history.

(56) References Cited

U.S. PATENT DOCUMENTS

| 5,789,893 | A | * | 8/1998 | Watkins ................. 318/701 |
| 6,586,904 | B2 | * | 7/2003 | McClelland et al. ........ 318/701 |
| 2005/0253540 | A1 | * | 11/2005 | Kobayashi et al. ......... 318/254 |

* cited by examiner

*Primary Examiner*—Karen Masih (74) *Attorney, Agent, or Firm*—Harness, Dickey & Pierce, P.L.C.

(57) ABSTRACT

Systems and methods for controlling a rotating electromagnetic machine. The rotating machine, such as a permanent magnet motor or hybrid switched reluctance motor, includes a stator having a plurality of phase windings and a rotor that rotates relative to the stator. A drive is connected to the phase windings for energizing the windings. A controller outputs a control signal to the drive in response to inputs of demanded torque, rotor position and/or speed. Control methods include calculating a scaled torque demand from the received torque demand to obtain substantially constant torque over a range of motor speeds, calculating an optimal dr-axis injection current using a cost function and a starting method that switches from speed control mode to torque control mode at a predetermined rotor speed or at predetermined start-up timing intervals.

23 Claims, 8 Drawing Sheets

Improved Open Loop Starting

CONTROL SYSTEMS AND METHODS FOR PERMANENT MAGNET ROTATING MACHINES

CROSS-REFERENCE TO RELATED APPLICATIONS

This application claims the benefit of U.S. Provisional Applications No. 60/694,077 and No. 60/694,066 filed Jun. 24, 2005, the entire disclosures of which are incorporated herein by reference.

FIELD OF THE INVENTION

The present invention relates generally to control of rotating machines, including but not limited to torque control of permanent magnet rotating machines.

BACKGROUND OF THE INVENTION

Various control systems and methods are known in the art for controlling the output torque of permanent magnet machines, such as brushless permanent magnet motors. Some of these machines are provided with position sensing devices to indicate, for motor control purposes, the rotor position with respect to the stator, while other machines detect the rotor position "sensorlessly." As recognized by the present inventors, a need exists for improvements in sensor-based and sensorless control systems for rotating permanent magnet machines, including those which control the output torque of a PM motor.

DETAILED DESCRIPTION OF EXEMPLARY EMBODIMENTS

Illustrative embodiments of the invention are described below. In the interest of clarity, not all features of an actual implementation are described in this specification. It will be appreciated that in the development of any actual embodiment, numerous implementation-specific decisions must be made to achieve specific goals, such as performance objectives and compliance with system-related, business-related and/or environmental constraints. Moreover, it will be appreciated that such development efforts may be complex and time-consuming, but would nevertheless be a routine undertaking for those of ordinary skill in the art having the benefit of this disclosure.

Figure 1:
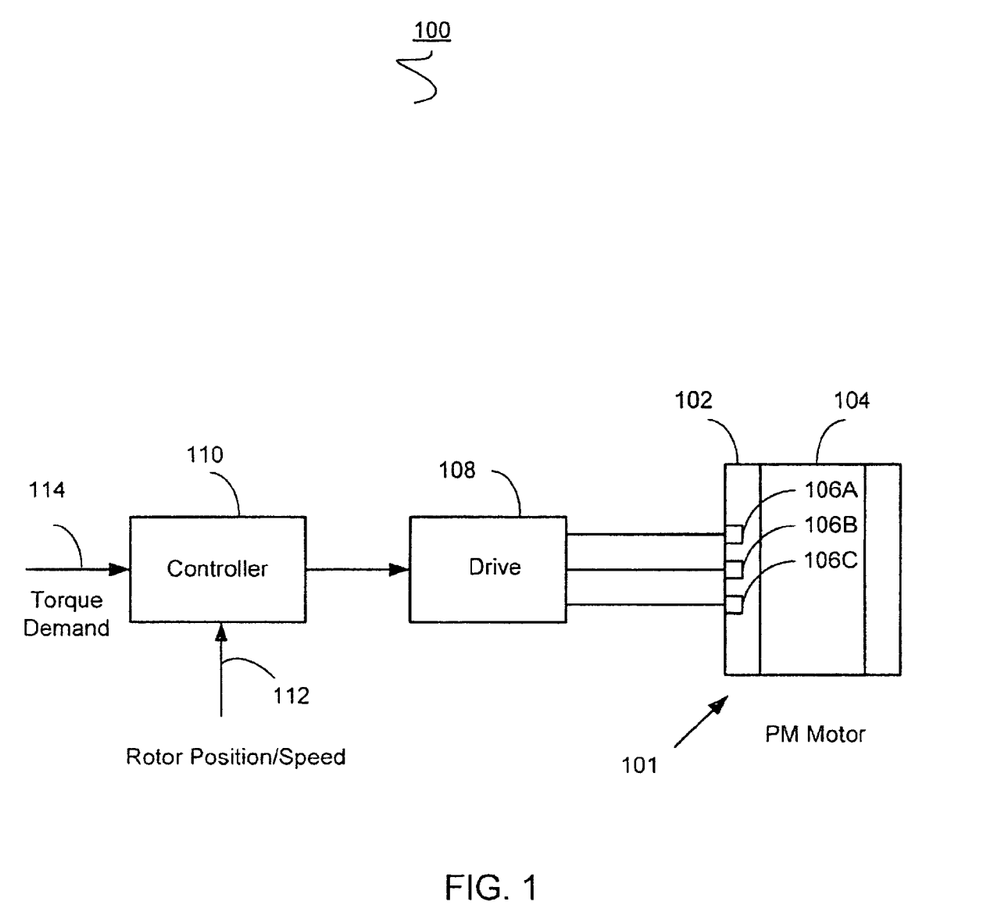
FIG. 1 is a block diagram of a rotating permanent magnet machine system according to one embodiment of the present invention.

FIG. 1 illustrates a rotating permanent magnet machine system 100 in accordance with one embodiment of the present invention. The machine system includes a rotating permanent magnet electric machine 101, such as a permanent magnet alternating current (PMAC) motor or a permanent magnet/switched reluctance (PM/SR) motor (i.e., a hybrid PM machine). For simplicity, the term "motor" is often used in this specification. However, one skilled in the art having the benefit of this disclosure will understand that the present invention is applicable to other types of rotating electric machines, including generators. The PM machine 101 shown in FIG. 1 includes a stationary component (stator) 102 and a rotating component (rotor) 104. The machine can have an inner rotor or an outer rotor construction. In this exemplary embodiment, the PM machine 101 is a three phase machine having an inner rotor construction with energizable phase windings 106A, 106B, 106C wound about the stator which is energized through the application of electric power to the motor terminals.

A drive 108 is coupled to provide electric power to the terminals of the machine. The drive 108 receives control inputs from a controller 110 that receives rotor position and rotor speed data 112 from one or more sensors coupled to the machine, or energization feedback from the machine (such as the currents and/or voltages at the motor terminals) from which the rotor position and rotor speed can be determined (i.e., sensorlessly). As an alternative to sensing voltages at the motor terminals, the controller can assume the actual voltage supplied to the motor is that which was demanded. Sensorless control systems and methods suitable for use with the present invention are described in co-pending U.S. Application Ser. No. 11/293,744, titled Sensorless Control Systems and Methods for Permanent Magnet Rotating Machines, filed [on even date herewith], the entire disclosure of which is incorporated herein by reference.

The controller 110 of FIG. 1 is configured to operate primarily in a torque control mode, and is therefore shown as receiving a torque demand 114 input. It should be understood, however, that certain aspects of the present invention apply to other modes of operation, including speed control modes, and are therefore not limited to torque control systems.

With further reference to FIG. 1, the torque demand 114 input may be received directly by the system as an external command or alternatively, may be derived from an external command. For example, the torque demand input may be derived from a speed demand input or from an air flow demand input (e.g., where the system of FIG. 1 is embodied in an air handler/blower for a climate control system).

While the drive of FIG. 1 is illustrated in exemplary form as energizing three power terminals of a three phase machine, it should be understood that more or fewer power terminals may be provided to accommodate machines with greater or less than three phases, or if various types of inverters (e.g., with neutral connections) are used. The drive may be of conventional design and configured to provide, e.g., sine wave excitation to the motor terminals or square wave excitation using pulse width modulation (PWM) excitation.

Figure 2:
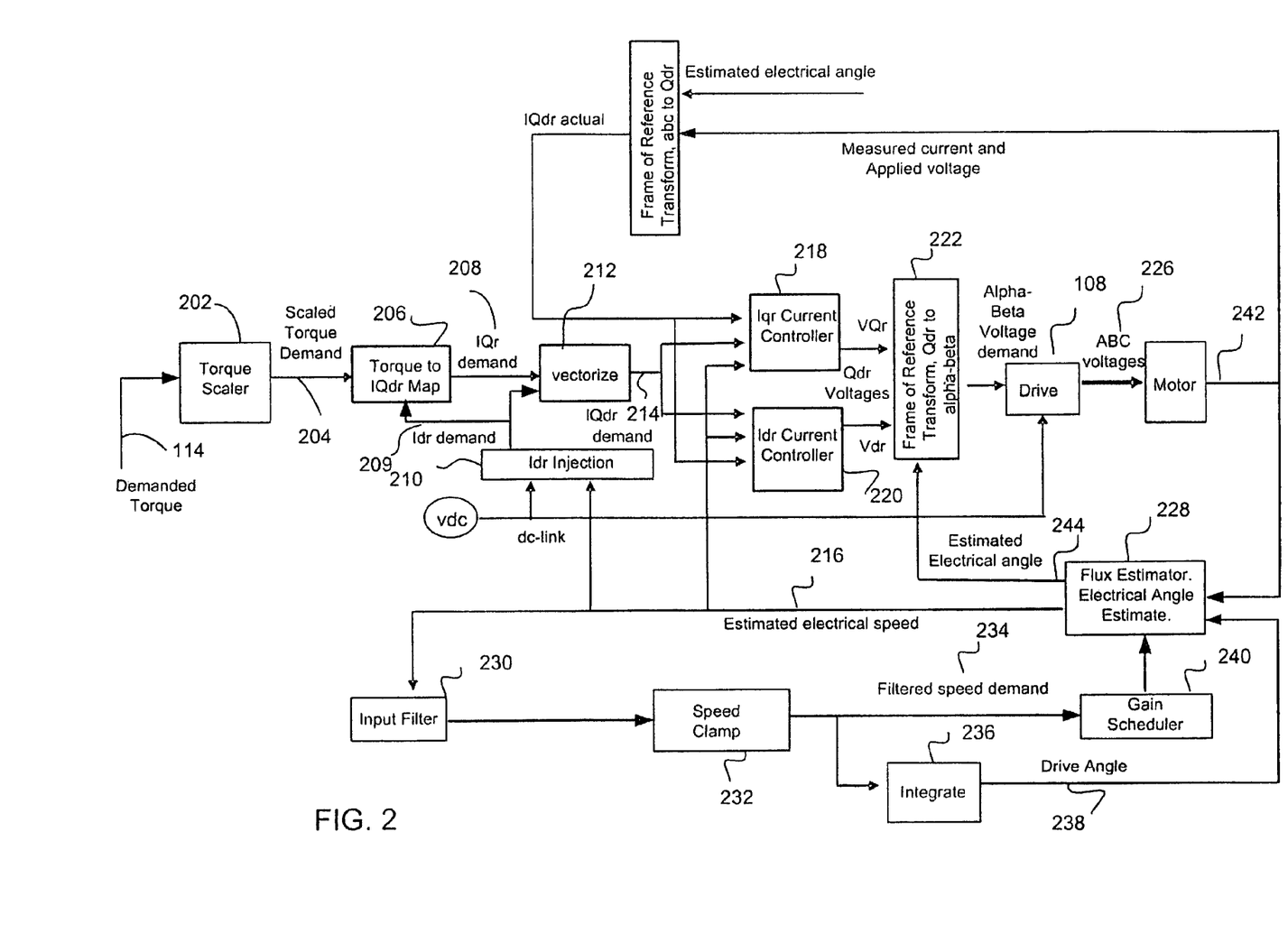
FIG. 2 is a block diagram of a sensorless implementation of the system of FIG. 1 according to another embodiment of the invention.

FIG. 2 illustrates additional details of the system (and primarily the controller) of FIG. 1. As shown in FIG. 2, the input torque demand 114 is provided to a torque scaler 202 (described further below with reference to FIG. 3) that produces a scaled torque demand 204. The scaled torque demand is provided to a Torque to IQdr Map block 206 that calculates an IQr demand 208 using motor-specific torque-to-IQr map data. The IQr demand is then concatenated with an Idr demand from an Idr Injection block 210 (described further below) into a vector quantity IQdr demand 214 by the vectorize block 212. As shown in FIG. 2, the value of the Idr demand 209 (i.e., dr-axis injection current) is calculated using the value of the DC link voltage, vdc, and the estimated electrical speed 216 received from a flux estimator 228 (e.g., as described In U.S. Pat. No. 6,756,753). The resulting IQdr demand takes into account the torque contribution, if any, of the dr-axIs current (e.g., as may be encountered in hybrid PM/SR motors).

With further reference to FIG. 2, the IQdr demand 214 from the vectorize block 212 is input to an lQr Current Controller 218 and an Idr Current Controller 220. These controllers convert the vector of motor currents in the electrical frame of reference to a vector of motor voltages in the electrical frame of reference. The vector of motor voltages is then transformed to alpha-beta-zero voltages 222 and provided to the drive 108. The drive converts the rotating alpha-beta-zero voltages to three ABC stationary reference frame voltages 226 that are applied to the motor terminals to produce the demanded torque (e.g., a constant torque) output.

The flux estimator block 228 of FIG. 2 produces the estimated electrical speed 216, as noted above, which is also provided to an input filter block 230 for smoothing the estimated electrical speed. The output of the input filter block 230 is provided to a speed clamp 232 (which defines minimum speed limits for stability purposes) to produce a filtered speed demand. The filtered speed demand 234 is provided to an integrator 236, which produces a drive angle command 238 for the flux estimator 228, and to a gain scheduler 240 (details of which are disclosed in the copending application noted above) which selects or calculates a gain factor as a function of the filtered speed demand and provides this gain factor to the flux estimator 228. The use of a filtered speed demand to develop the drive angle command 238 to the flux estimator 228 improves the torque stability of the machine. Using the gain factor from the gain scheduler 240, the drive angle command 238, and energization feedback 242 from the PM machine, the flux estimator 228 calculates an estimated electrical angle 244 (which is provided to a vector controller which uses the estimated angle to execute transforms) and an estimated electrical speed 216.

Figure 5:
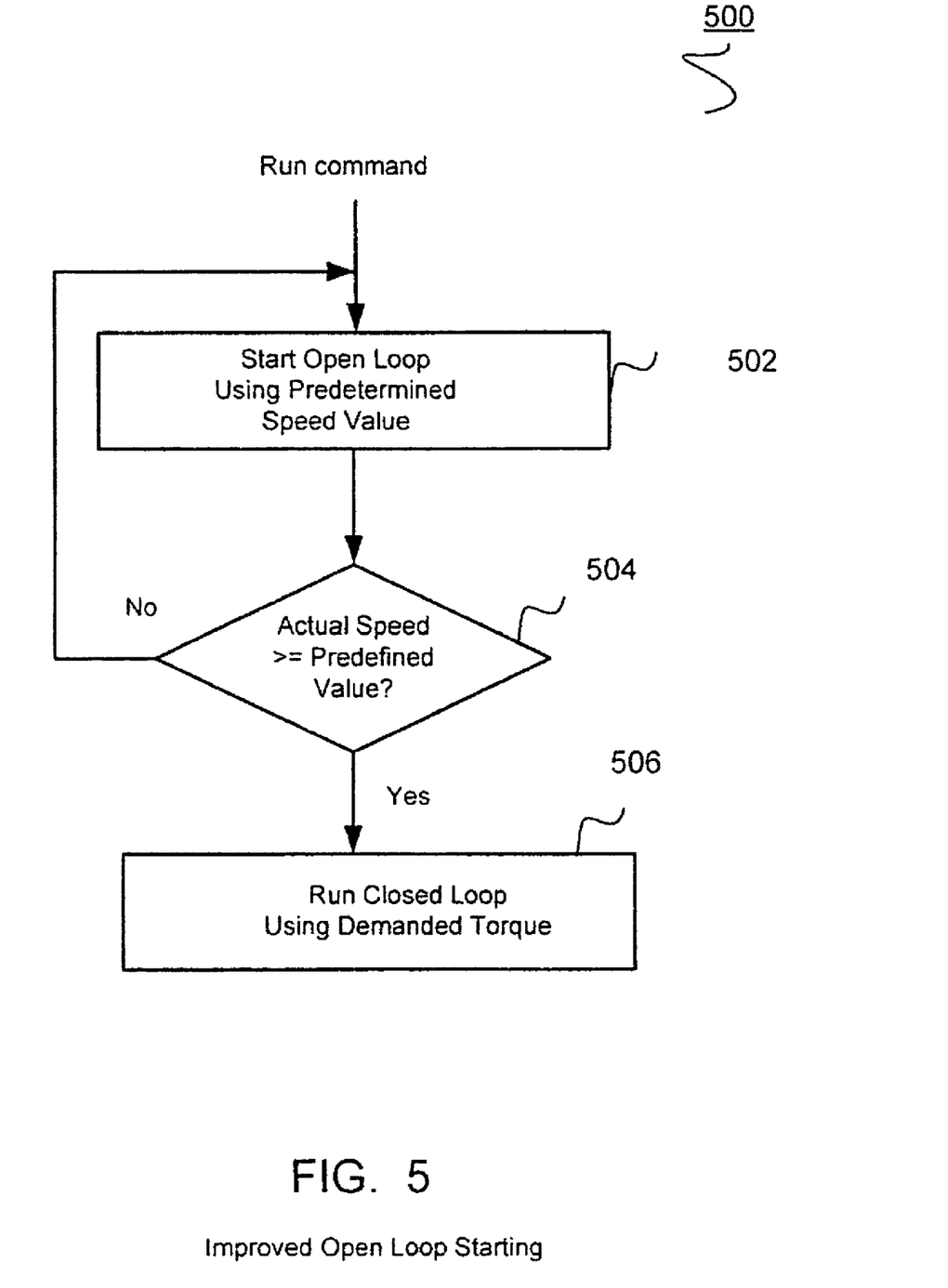
FIG. 5 is a flow diagram of an open loop starting method according to another embodiment of the present invention.

At start-up, when the rotor speed is zero, the controller of FIG. 2 operates in an open loop speed control mode using a predetermined speed value (which takes into account characteristics of the PM machine). The controller operates in this open loop speed control mode until the rotor speed reaches a predefined threshold value (which may also be specific to the given PM machine), and then switches to a closed loop torque control mode of operation using the input torque demand. This is further illustrated by the flow diagram 500 of FIG. 5, where upon receipt of a run command, the PM machine system starts, at step 502, in open loop using a predefined speed value. As the actual speed is sampled by the system, it is compared in step 504 to a predefined value. If the actual speed is greater than the predefined value, the system switches, in step 506, to closed loop operation using the demanded torque. If the actual speed is below the predefined threshold, the system continues open loop operation in step 502.

Figure 6:
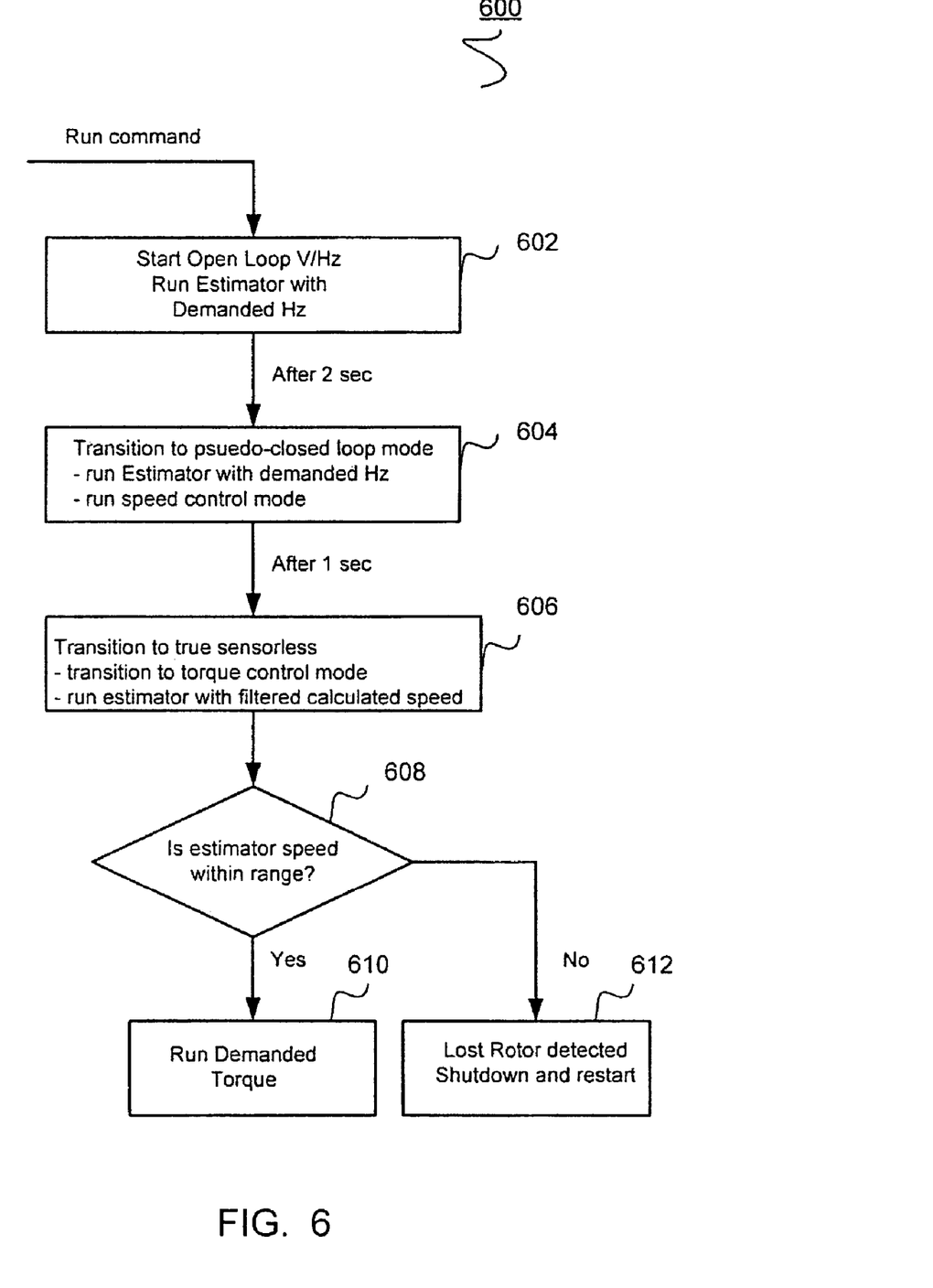
FIG. 6 is a flow diagram of an alternative start-up method according to another embodiment of the invention.

An alternative start-up operation is illustrated by the flow diagram 600 of FIG. 6. As shown in step 602, the controller operates at start-up in an open loop mode using a demanded speed value. After a predetermined amount of time, e.g., two seconds, the controller transitions to a pseudo-closed loop speed control mode in step 604. After a further predetermined amount of time, e.g., one second, the controller transitions to a sensorless control mode in step 606, e.g., a torque control mode, and runs an estimator (such as the estimator 228 shown in FIG. 2) at a scheduled gain corresponding to the filtered estimated speed 234. In step 608, the controller determines whether the estimated electrical speed produced by the estimator is within range. If so, the controller runs a demanded torque in step 610. Otherwise, the controller will shutdown the system and attempt a restart as indicated in step 612.

Figure 3:
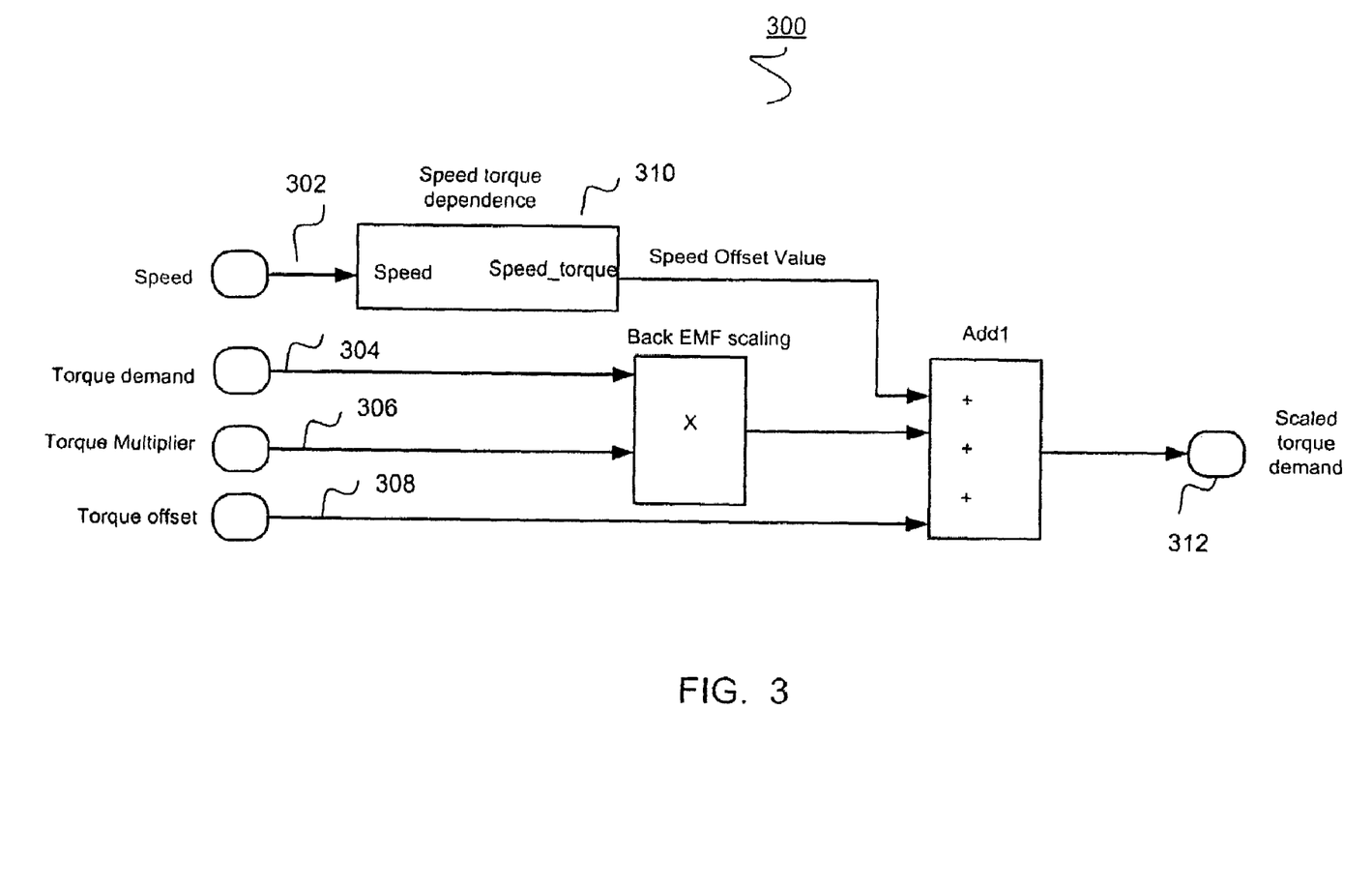
FIG. 3 is a block diagram of an exemplary embodiment of the torque scaler shown in FIG. 2.

FIG. 3 illustrates an exemplary embodiment 300 of the torque scaler block shown in FIG. 2. In this embodiment, the torque scaler 300 produces the scaled torque demand from input values of the rotor estimated speed 302, the torque demand 304, a torque multiplier 306, and a torque offset 308. The torque multiplier 306 and the torque offset value 308 are preferably motor-specific parameters which compensate for individual motor characteristics. The torque offset 308 is preferably the minimum torque value required to run the motor without a load (also referred to as free shaft operation) As shown in FIG. 3, the rotor speed is converted to a corresponding speed offset by a speed-torque dependence block 310 which may be, e.g., a look-up table containing speed-torque table values for the particular motor being controlled.

In this embodiment of the torque scaler, the scaled torque demand 312 is calculated as the sum of three components:

Speed offset+(Torque demand)*(Torque multiplier)+ Torque offset.

A typical torque versus motor speed operating curve of a PM motor or hybrid PM/SR motor exhibits a negative slope at higher operating speeds after attaining a maximum torque. To achieve a constant motor torque output with increasing motor speed, the value of the demanded torque is increased (i.e., compensated) by the control system as the motor operating speed increases, thereby making the torque lines flatter with speed. Motor-specific correction factors vary the torque gain factor as a function of IQr current and speed to achieve a substantially constant torque over the operating speed range of the motor. In some embodiments, estimated speed is used as the speed variable in the torque scaler.

With further reference to FIG. 2, the Idr injection block 210 ensures that optimal use of the DC link voltage is made in order to achieve the desired IQr current demand 208. This is achieved by defining an optimization problem using several costs. These costs may include terms such as: required voltage to support the demanded Qr and dr axis currents; a bulk current term; and power consumption. Solving this optimization problem for particular operation conditions, such as motor speed and the value of the dc-link, yields a desired value of dr-axis current. In the context of the present discussion, the term phase advance is understood to be the action of setting this current value as a demand for the dr-axis current controller. As disclosed in the copending application referenced above, the value of IQr demand 208 current is compensated for the torque contribution of the Idr injection current using motor-specific performance characteristics.

Figure 4:
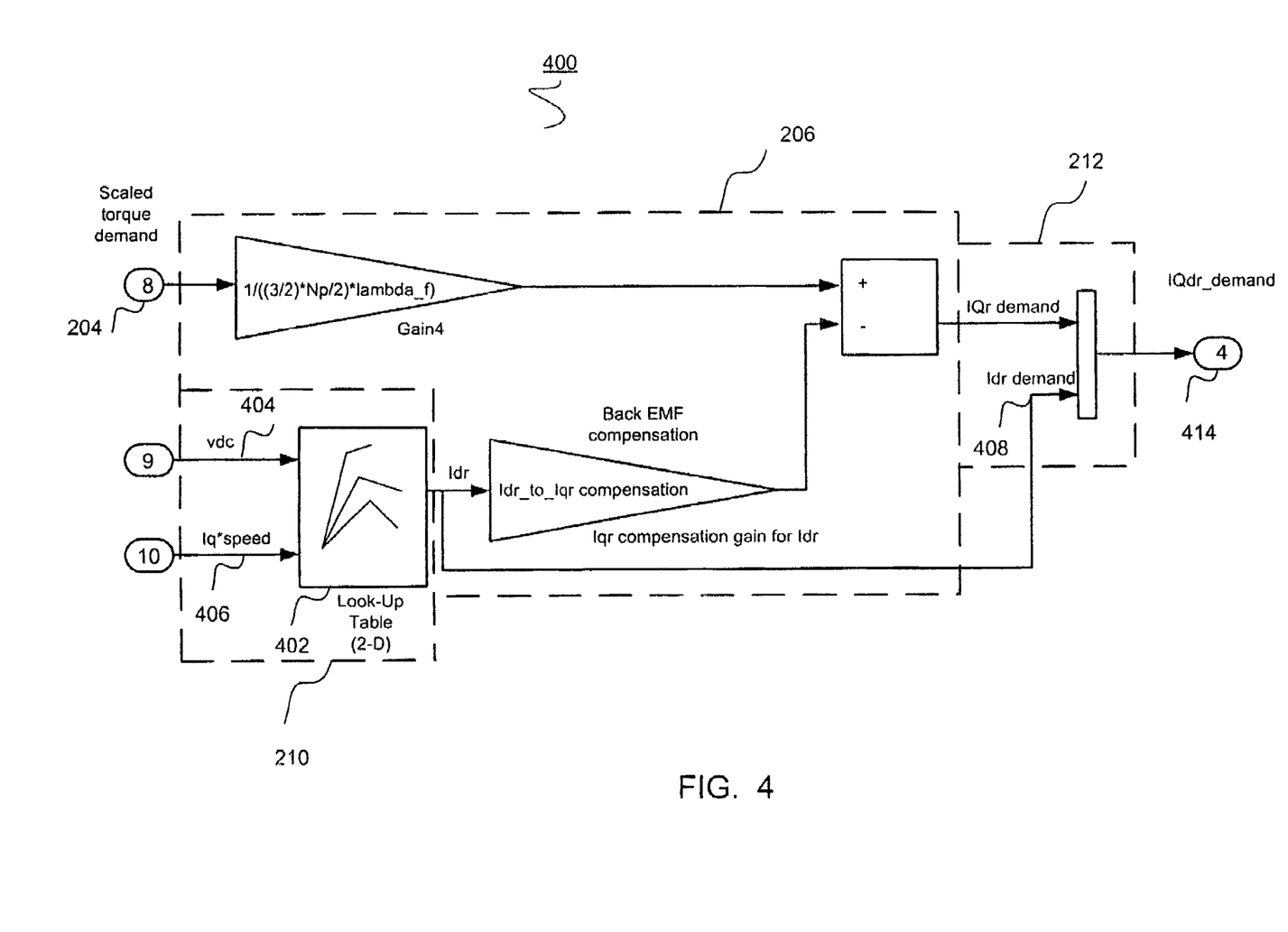
FIG. 4 is a block diagram of an exemplary embodiment of the Idr Injection block, the Torque to IQdr Map block and the vectorize block of FIG. 2.

FIG. 4 shows an exemplary embodiment of the Idr Injection block 210, the Torque to IQdr Map block 206, and the vectorize block 212 of FIG. 2. In the embodiment of FIG.

4, the Idr demand (i.e., the dr-axis current injection) is calculated from a look-up table 402 (specific to the PM motor) that considers vdc 404, and the product of the current value Id and estimated speed 406. The calculated value of Idr demand 408 is provided to a vectorize block 412, as well as to an Idr compensation gain for Idr within the Torque to IQdr Map block 206. Although the Idr injection current in this embodiment is determined solely as a function of vdc, IQr, and rotor speed, the Idr injection current can alternatively be determined using a cost function having components relating to bulk current costs, power consumption and/or torque, in addition to or in lieu of components relating to vdc, IQr and rotor speed.

Additional details of the method for calculating the amount of Idr injection current provided to the Torque to IQdr Map 206 and the vectorize 212 blocks in FIG. 2 will now be described. For machines controlled via a speed loop controller, the speed error is converted to a demanded torque 114 by the speed loop controller and the demanded torque 114 is provided as an input to the Torque to IQdr Map block 206. Thus, Idr injection current can be applied within either a speed controlled or torque controlled machine. Idr injection current, also described in the art as a phase advance current, may contribute 20% or more of the torque of a hybrid PM machine. When this torque component is present, the control system preferably compensates (i.e., adjusts) the magnitude of the IQr demand current to achieve the desired torque output.

The general approach is to optimize the value of Idr demand using a cost function. The cost function incorporates values associated with utilization of the DC link; bulk current terms; power and torque. The goal of the optimization problem is to calculate the amount of injection current necessary so that the total voltage required to drive the demanded currents does not exceed that available from the inverter (i.e., vdc).

To optimize the value of Idr injection current, the appropriate cost components are defined for use in the cost equation. With the cost expression defined, the closed form solution for the value of Idr becomes one of differentiating the cost expression with respect to Idr-current, setting the result equal to zero and solving for the roots (i.e., solutions) of the resulting equation (i.e., a typical maxima/minima calculus problem).

The equation used for optimization can be derived in the following manner:
1. Define cost component associated with volts;
2. Define one or more secondary cost functions, associated with power or bulk current;
3. Include a cost function associated with torque demand, particularly when dealing with a hybrid motor; and
4. Optimize with respect to Idr current.

The cost function associated with voltage is the nominal DC link value needed to support the ordered pair of Qr and dr currents. This is the primary component of the cost function. Secondary cost terms may include bulk current terms, indicative of efficiency, or torque or power consumption.

In each cost component term, the standard approach is to normalize each individual term with respect to some nominal maximal value (e.g., IQr, Idr, power). This produces a typical range of [−1,1] for the cost. A weighting index can also be applied to each term that allows for a certain degree of fine tuning.

The central component of any defined cost function is the term defining the required voltage. The presence of secondary cost components can be used to condition the solution in a way that may be more appropriate for a given PM machine. In others embodiments, greater emphasis may be placed on efficiency.

The fundamental electrical equation in the electrical Frame of Reference is:

$$v_{Qdr} = R \cdot I_{Qdr} + \begin{pmatrix} \lambda_f \omega_r \\ 0 \\ 0 \end{pmatrix} + (L+M) \cdot \left(\frac{d}{dt} I_{Qdr}\right) + \omega_r \cdot (L+M) \cdot G \cdot I_{Qdr} \quad (1)$$

Writing the single vector equation as two coupled scalar equations:

$$v_{Qr} = R \cdot I_{Qr} + \lambda_f \omega_r + (L+M) \cdot \frac{d}{dt} I_{Qr} + \omega_r \cdot (L+M) \cdot I_{dr} \quad (2)$$

$$v_{dr} = R \cdot I_{dr} + (L+M) \cdot \frac{d}{dt} I_{dr} - \omega_r \cdot (L+M) \cdot I_{Qr} \quad (3)$$

Then, the condition so that the required voltages in the Qdr frames of reference do not exceed that which can be provided by the dc-link is given by:

$$[I_{Qr} \cdot R + \lambda_f \omega_r + \omega_r \cdot (L+M) \cdot I_{dr}]^2 + [R \cdot I_{dr} - \omega_r \cdot (L+M) \cdot I_{Qr}]^2 \leq \frac{2}{3} \cdot K_{pwmd} v_{dc}^2 \quad (4)$$

An exemplary voltage cost function becomes:

$$[I_{Qr} \cdot R + \lambda_f \omega_r + \omega_r \cdot (L+M) \cdot I_{dr}]^2 + \frac{[R \cdot I_{dr} - \omega_r \cdot (L+M) \cdot I_{Qr}]^2}{\frac{2}{3} \cdot (K_{pwmd} v_{dc})^2} \cdot K_{vdc} \quad (5)$$

This is the central component of the optimization cost function.

Torque can be used as part of the cost function, in particular to drive the proposed solution such that a torque demand can be met. The torque cost component can be expressed in a normalized form as:

$$\frac{3}{2} \cdot \frac{N_p}{2} \cdot \lambda_f I_{Qr} \cdot \frac{k_{torque}}{T_{max}} \quad (6)$$

Such an expression is normalized against maximal torque demand $T_{max}$ and scaled according to a defined weighting $k_{torque}$.

When the motor under consideration is a hybrid motor, the presence of dr-axis current itself generates more torque. In such applications, less $I_{Qr}$-axis current is needed and correspondingly less vdc voltage. In one exemplary embodiment, the expression for the torque related cost function is:

$$[(0.3764 \cdot I_{Qr} - 0.0093 \cdot I_{Qr} \cdot S) - T_{max}]^2 \cdot k_{torque} \quad (7)$$

Such an expression as that presented in Equation (7) above replaces Equation (6) in the aggregate cost function.

A good indicator of efficiency is the bulk current term, or sum of the squares of current. Many of the loss mechanisms present in a motor manifest themselves through expressions involving squared current terms. Hence, an appropriate bulk current cost term, normalized to $I_{max}$, is given by:

$$\frac{I_{Qdr}^T \cdot I_{Qdr}}{I_{max}} \cdot k_{bulk} \tag{8}$$

where the $I_{max}$ is the sum of squares of the maximal values of current expected in both axes.

A variant upon the concept of bulk current as a component of the cost function is to use a cost function based upon power consumption, again normalized to $P_{max}$:

$$\frac{V_{Qdr}^T \cdot I_{Qdr}}{P_{max}} \cdot k_{power} \tag{9}$$

A typical cost function is then expressed as the sum of the three cost components:

voltage_cost_component+bulk_current_cost_component+required_torque_cost_component This optimization problem can be solved by taking a derivative with respect to the variable sought to be minimized. In one exemplary embodiment, the variable is the Idr-axis current.

With a proposed solution available, it then becomes necessary to substitute back into the original electrical equation the calculated optimized value for Idr and determine the margin between required voltage to drive the desired current and the value of vdc. If such margin exists, then the proposed solution is useful. This checking process is illustrated in the example below.

Equation 10 is one embodiment of a cost function, A, where A includes the motor-specific cost components for voltage, bulk current and torque:

$$A(I_{Qr}, I_{dr}, \omega_r, v_{dc}, K_{pwmd}, K_{vdc}, K_{bulk}, K_{torque}) := \tag{10}$$

$$[I_{Qr} \cdot R + \lambda_f \omega_r + \omega_r \cdot (L+M) \cdot I_{dr}]^2 +$$

$$\frac{[R \cdot I_{dr} - \omega_r \cdot (L+M) \cdot I_{Qr}]^2}{\frac{2}{3} \cdot (K_{pwmd} v_{dc})^2} \cdot K_{vdc} \ldots +$$

$$\frac{(I_{Qr}^2 + I_{dr}^2) \cdot K_{bulk}}{I_{norm}} + \frac{[(0.3763 I_{Qr} - 0.00931 I_{dr}) - 7]^2}{T_{norm}} \cdot K_{torque}$$

$K_{bulk}$, $K_{vdc}$ and $K_{torque}$ are weighting coefficients for the bulk current, voltage and torque cost components, respectively.

The exemplary cost function in Equation 10 includes the following motor variables:

L=self inductance, M=mutual inductance, R=resistance
$I_{Qr}$=Qr axis current, $I_{dr}$=dr axis current
$\lambda_f$=BEMF, $\omega_r$=electrical speed When the maximum current of each axes current is 18 amperes:

$$I_{norm} := 18^2 + 18^2$$

Define weighting coefficients associated with the optimization process:

$v_{dc}$=dc-link value, $K_{pwm}$=PWM duty cycle, typically 0.85 to 0.95

$K_{vdc}$=voltage weighting function, $K_{bulk}$=bulk current weighting $K_{torque}$=torque weighting function Weighting coefficients are used with respect to the vdc usage as well as an aggregate $I_{Qr}$ current term. The minimum of the exemplary cost function in Equation 10 occurs for some value of dr-axis current such that:

$$\frac{d}{dI_{dr}}(A(I_{Qr}, \omega_r, v_{dc}) = 0) \tag{11}$$

Figure 7:
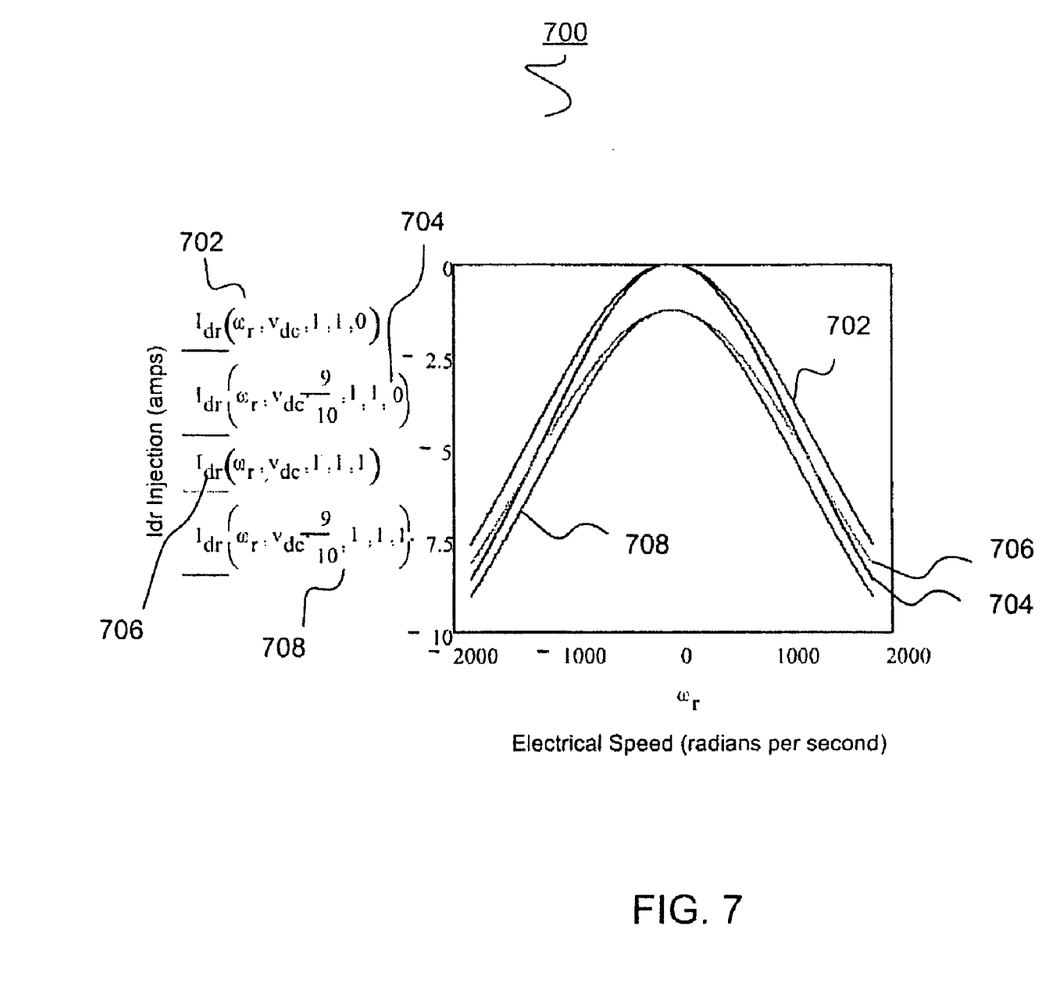
FIG. 7 is a graph illustrating how the optimized calculated value of Idr injection current varies with electrical speed.

The graph 700 of FIG. 7 illustrates how the magnitude of the injection current varies with motor electrical speed and vdc for various weighting values (702,704,706,708) of $K_{vdc}$, $K_{pwm}$ and $K_{torque}$. This exemplary embodiment uses estimated electrical speed 216 in its calculation of Idr injection current.

Note that in both motoring and generating mode, the sign of the Idr current is chosen as negative. Should it ever become positive then there arises the possibility that the motor could act as a good generator, a situation which may not be desirable unless actually required.

Having arrived at an optimized solution for injection current, it is desirable to check its validity. This can be done by substituting the value for Idr injection current into the electrical equation and checking that the dc link value is sufficient.

$$I_{Qr}: = I_{Qr}$$

$$\omega_r: = 0$$

$$\omega_r: = \omega_r$$

$$[I_{Qr} \cdot R + \lambda_f \omega_r + \omega_r \cdot (L+M) \cdot I_{dr}(\omega_r, v_{dc})]^2 +$$

$$[R \cdot I_{dr} - \omega_r \cdot (L+M) \cdot I_{dr}(\omega_r, v_{dc})]^2 = \frac{2}{3} \cdot K_d v_{dc}^2$$

In such a test one may choose to deliberately round motor parameters and other variables or states associated with the problem so as to investigate the typical worst case scenario.

The difference or residue between what voltage is needed and that which the DC link offers is given by:

$$Res(I_{Qr}, I_{dr}, \omega_r, v_{dc}): = [I_{Qr} \cdot R + \lambda_f \omega_r \cdot (L+M) \cdot I_{dr}]^2 + \tag{12}$$

$$[R \cdot I_{dr} - \omega_r \cdot (L+M) \cdot I_{Qr}]^2 -$$

$$\frac{2}{3} \cdot v_{dc}^2$$

$$\omega_r: = \omega_r$$

$$I_{Qr}: = I_{Qr}$$

$$v_{dc}: = v_{dc}$$

Figure 8:
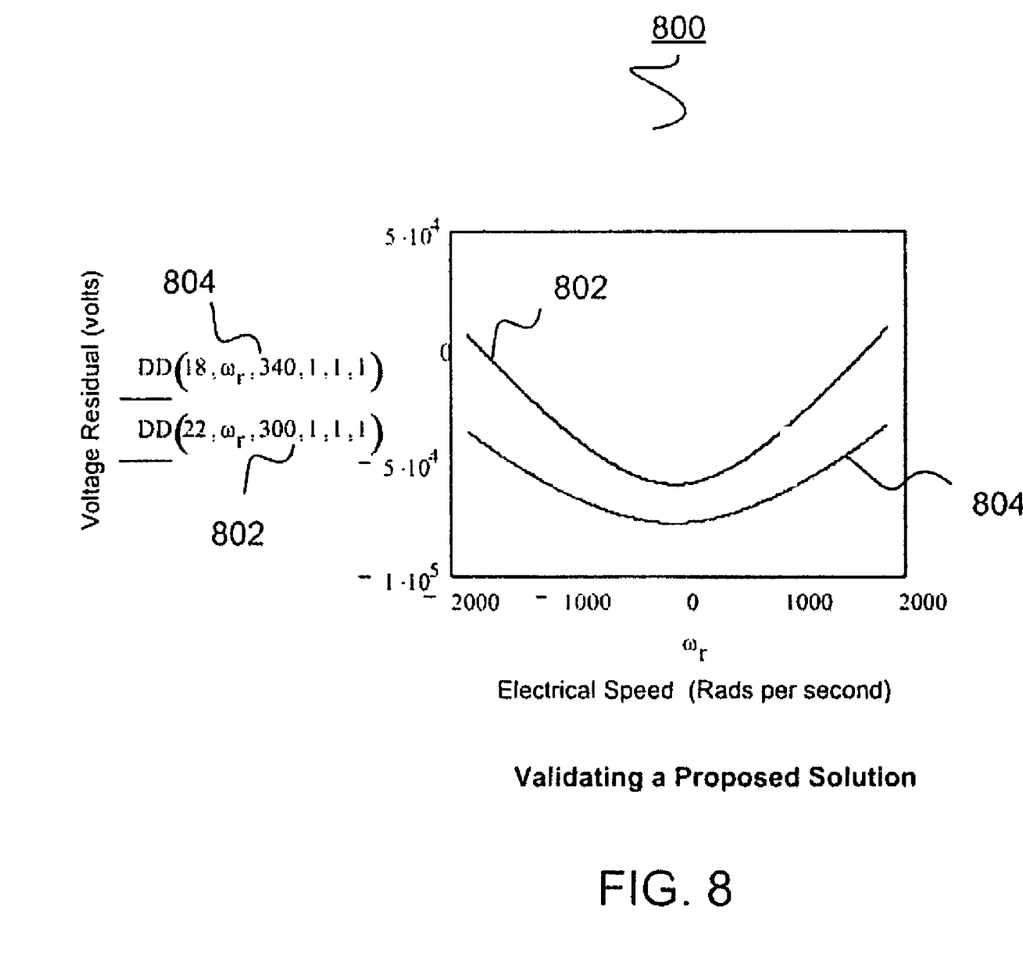
FIG. 8 is a graph validating the proposed solution for the optimized calculation of Idr.

The graph 800 of FIG. 8 illustrates the value of the voltage residual with motor electrical speed about zero speed for two sets of values 802, 804 of $I_{Qr}$ and vdc (18 amps, 340 volts) and (22 amps, 300 volts) for unity values of $K_{vdc}$, $K_{pwm}$ and $K_{torque}$. This plot indicates that the proposed solution is successful, even though one of the validation plots 802 fails at the extreme speed range when more than the specified current is used and there is a drop in bus voltage. Plot 804 illustrates that the proposed solution is successful throughout the expected speed of operation.

The description of the invention above is merely exemplary in nature and, thus, variations that do not depart from the gist of the invention are intended to be within the scope of the invention. Such variations are not to be regarded as a departure from the spirit and scope of the invention.

What is claimed is:

1. A method of controlling a permanent magnet rotating machine, the machine including a stator and a rotor situated to rotate relative to the stator, the stator having a plurality of energizable phase windings situated therein, the method comprising:
   receiving a rotor torque demand; and
   calculating a scaled torque demand from the received torque demand as a function of a speed of the machine to obtain a substantially constant rotor torque over a range of rotor speeds.

2. The method of claim 1 wherein said speed is an estimated speed of the machine.

3. The method of claim 2 wherein calculating further includes calculating the scaled torque demand as a function of a torque offset value.

4. The method of claim 1 wherein calculating includes calculating the scaled torque demand as a function of a speed offset value.

5. The method of claim 1 wherein calculating includes calculating the scaled torque demand as a function of a torque offset value.

6. A method of controlling a permanent magnet rotating machine, the machine including a stator and a rotor situated to rotate relative to the stator, the stator having a plurality of energizable chase windings situated therein, the method comprising:
   receiving a rotor torque demand; and
   calculating a scaled torque demand from the received torque demand to obtain a substantially constant rotor torque over a range of rotor speeds, including calculating the scaled torque demand such that scaled torque demand=a torque offset value+the torque demand* ((torque multiplier)+a speed offset value).

7. The method of claim 6 further comprising calculating the torque offset value, the torque multiplier, and the speed offset value according to characteristics of said machine.

8. The method of claim 7 wherein calculating includes the torque offset value, the torque multiplier, and the speed offset value from a speed-torque map for said machine.

9. A permanent magnet rotating machine and controller assembly configured to perform the method of claim 1.

10. A climate control system comprising the assembly of claim 9.

11. The climate control system of claim 10 wherein the system includes an air handler and wherein the air handler includes said assembly.

12. A method of controlling a permanent magnet rotating machine, the machine including a stator and a rotor situated to rotate relative to the stator, the stator having a plurality of energizable phase windings situated therein, the method comprising:
   calculating an IQr demand from a speed or torque demand;
   calculating a dr-axis injection current demand as a function of a speed of the rotor; and
   combining the IQr demand and the dr-axis injection current demand to produce an IQdr demand that is compensated for any torque contribution of dr-axis-current.

13. The method of claim 12 wherein calculating includes calculating the dr-axis injection current demand further as a function of a maximum voltage available for energizing the machine.

14. The method of claim 12 wherein calculating includes calculating the dr-axis injection current demand as a function of estimated speed of the rotor, a q-axis current, and a maximum voltage available for energizing the machine.

15. The method of claim 12 wherein calculating includes calculating the dr-axis injection current demand using a cost function.

16. The method of claim 12 further comprising assuming a maximum value of a Qr-axis current.

17. The method of claim 12 wherein calculating includes defining a cost function having one or more cost components associated with volts, power consumption, and/or bulk current, and optimizing with respect to the dr-axis injection current.

18. The method of claim 17 wherein optimizing includes differentating the cost function with respect to the dr-axis injection current.

19. The method of claim 12 further comprising determining the speed of the rotor with or without sensors.

20. The method of claim 12 further comprising operating the machine in a torque control mode or a speed control mode.

21. A permanent magnet rotating machine and controller assembly configured to perform the method of claim 12.

22. A climate control system comprising the assembly of claim 21.

23. The climate control system of claim 22 wherein the system includes an air handler and wherein the air handler includes said assembly.

* * * * *

UNITED STATES PATENT AND TRADEMARK OFFICE
Certificate

Patent No. 7,208,895 B2                    Patented: April 24, 2007

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Joseph G. Marcinkiewicz, St. Peters, MO (US); Prakash B. Shahi, St. Louis, MO (US); Michael I. Henderson, North Yorkshire (GB); and Arthur E. Woodward, Manchester, MO (US).

Signed and Sealed this Third Day of February 2009.

Donovan Lincoln
*Supervisory Patent Examiner*
Art Unit 2837